(12) United States Patent
Gielda

(10) Patent No.: US 6,199,933 B1
(45) Date of Patent: Mar. 13, 2001

(54) INSULATED WINDOW SYSTEM FOR A VEHICLE

(75) Inventor: Thomas Paul Gielda, Brighton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/469,708

(22) Filed: Dec. 22, 1999

(51) Int. Cl.⁷ ............................................. B60J 1/02
(52) U.S. Cl. ..................... 296/96.14; 296/211; 296/97
(58) Field of Search ........................ 296/211, 96.19, 296/84.1, 901, 146.2, 218, 96.14; 52/788.1, 204.593

(56) References Cited

U.S. PATENT DOCUMENTS

| | | | |
|---|---|---|---|
| 2,383,169 | * 8/1945 | Slicer | 296/96.14 |
| 4,041,208 | * 8/1977 | Seeger et al. | 428/424 |
| 4,562,676 | 1/1986 | Kruschwitz . | |
| 4,627,145 | 12/1986 | Niemanns . | |
| 4,894,972 | 1/1990 | Endoh et al. . | |
| 4,994,315 | 2/1991 | Schreiber et al. . | |
| 5,033,249 | * 7/1991 | Scheeren et al. | 296/96.14 |
| 5,062,248 | 11/1991 | Kunert . | |
| 5,085,021 | 2/1992 | Kunert . | |
| 5,120,584 | * 6/1992 | Ohlenforst et al. | 296/96.14 |
| 5,137,770 | 8/1992 | Rothe et al. . | |
| 5,154,953 | * 10/1992 | De Moncuit et al. | 296/96.14 |
| 5,239,406 | * 8/1993 | Lynam | 259/275 |
| 5,413,397 | 5/1995 | Gold . | |
| 5,466,037 | * 11/1995 | De Lena | 296/211 |
| 5,478,132 | 12/1995 | Gold . | |
| 5,525,675 | * 6/1996 | Masuda et al. | 525/194 |
| 5,544,458 | 8/1996 | Allison et al. . | |
| 5,620,648 | 4/1997 | Volkmann et al. . | |
| 5,773,102 | * 6/1998 | Rehfeld | 296/96.14 |
| 5,846,650 | * 12/1998 | Ko et al. | 428/336 |
| 6,039,390 | * 3/2000 | Agrawal et al. | 296/211 |

FOREIGN PATENT DOCUMENTS

| | | | |
|---|---|---|---|
| 3320348 | * 10/1984 | (DE) | 296/96.14 |
| 3810524 | * 10/1989 | (DE) | 296/96.14 |
| 0327793 | * 8/1989 | (EP) | 296/96.14 |
| 0334721 | * 9/1989 | (EP) | 296/96.14 |
| 000485770 | * 5/1992 | (EP) | 296/96.14 |
| 0920318 | * 4/1947 | (FR) | 296/96.14 |
| 0922866 | * 4/1963 | (GB) | 296/96.14 |
| 0021915 | * 2/1981 | (JP) | 296/97 |
| 406227250 | * 8/1994 | (JP) | 296/96.14 |

\* cited by examiner

Primary Examiner—Joseph D. Pape
Assistant Examiner—Kiran Patel
(74) Attorney, Agent, or Firm—Larry I. Shelton

(57) ABSTRACT

An insulated window system for a vehicle includes a first wall of plastic material disposed in a window opening of the vehicle and a second wall of plastic material disposed in the window opening and spaced a predetermined distance from the first wall to form a gap therebetween.

19 Claims, 1 Drawing Sheet

INSULATED WINDOW SYSTEM FOR A VEHICLE

BACKGROUND OF THE INVENTION

1. Field of the Invention

The present invention relates generally to windows for vehicles and, more specifically, to an insulated window system for a vehicle.

2. Description of the Related Art

It is known to provide a window for a vehicle such as a windshield for a front opening in a vehicle body of a motor vehicle. Typically, the windshield includes two glass panels or sheets laminated to each other by an adhesive film or interlayer therebetween. Additionally, the window may be a side window for a side opening in the vehicle body. The side window is typically a single glass panel or sheet.

It is also known to provide a climate control system for a vehicle for heating and cooling of an occupant compartment of the vehicle body of the motor vehicle. It is further known that glass panels are susceptible to heat transfer. As a result, convective losses through the glass panels of the windows are a major contributor to the thermal load on the climate control system of the vehicle.

Although the above windows have worked, it is desirable to improve the thermal resistances of the windows for a vehicle. It is also desirable to provide a dual pane window for a vehicle. It is further desirable to provide an insulated window system for a vehicle. Therefore, there is a need in the art to provide a window system for a vehicle that meets these desires.

SUMMARY OF THE INVENTION

Accordingly, the present invention is an insulated window system for a vehicle including a first wall of plastic material disposed in a window opening of the vehicle. The insulated window system also includes a second wall of plastic material disposed in the window opening and spaced a predetermined distance from the first wall to form a gap therebetween.

One advantage of the present invention is that an insulated window system is provided for a vehicle to improve performance and NVH of the vehicle. Another advantage of the present invention is that the insulated window system is an insulated dual wall polycarbonate window, which is constructed in a one shot injection molding process. Yet another advantage of the present invention is that the insulated window system is approximately the same weight as single pane glass units but has thermal resistances on an order of magnitude larger. Still another advantage of the present invention is that the insulated window system greatly reduces the thermal load on the climate control system of the vehicle. A further advantage of the present invention is that insulated window system improves climate control performance with a subsequent increase in fuel economy of the vehicle.

Other features and advantages of the present invention will be readily appreciated, as the same becomes better understood, after reading the subsequent description when taken in conjunction with the accompanying drawings.

DESCRIPTION OF THE PREFERRED EMBODIMENT(S)

Figure 1:
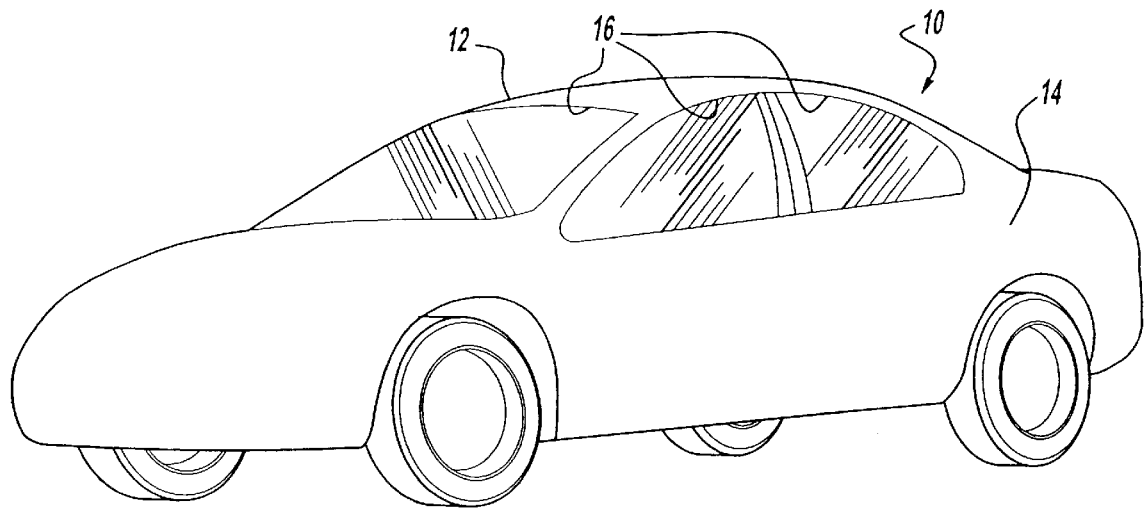
FIG. 1 is an elevational view of an insulated window system, according to the present invention, illustrated in operational relationship with a vehicle.
Figure 2:
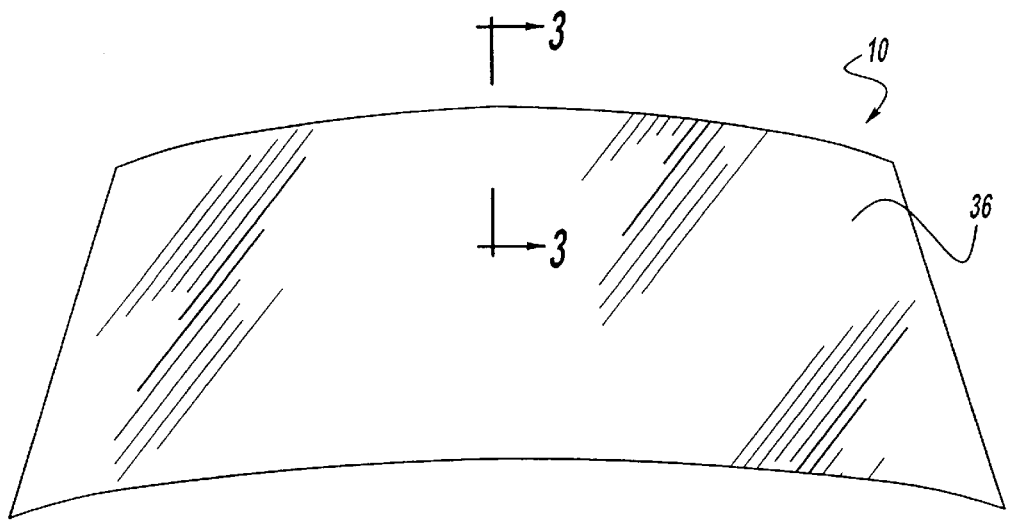
FIG. 2 is a front elevational view of the insulated window system of FIG. 1.
Figure 3:
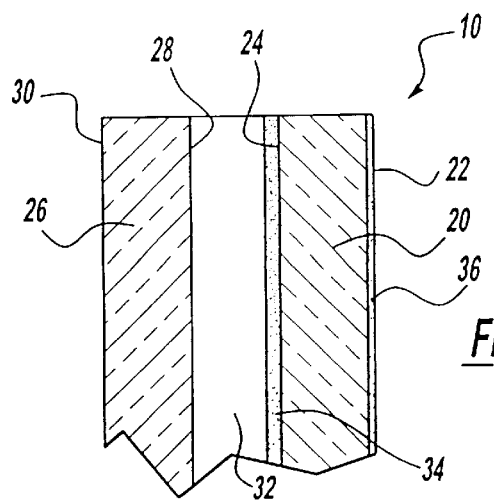
FIG. 3 is a sectional view taken along line 3—3 of FIG. 2.

Referring to the drawings and in particular to FIGS. 1 through 3, one embodiment of an insulated window system 10, according to the present invention, is illustrated in operational relationship with a vehicle 12 such as a motor vehicle. The vehicle 12 includes a vehicle body 14 having at least one, preferably a plurality of window openings 16. The insulated window system 10 is disposed in at least one of the window openings 16 and secured therein to the vehicle body 14 by suitable means such as a seal (not shown). It should be appreciated that the insulated window system 10 can be used at another one or all of the window openings 16 for the vehicle 12 such as front, side and rear windows. It should also be appreciated that, except for the insulated window system 10, the vehicle 12 is conventional and known in the art.

Referring to FIGS. 2 and 3, the insulated window system 10 includes a first or outer wall 20. The outer wall 20 has a first side or outer surface 22 and a second side or inner surface 24. The insulated window system 10 also includes a second or inner wall 26. The inner wall 26 has a third side or outer surface 28 and a fourth side or inner surface 30. The outer wall 20 and inner wall 26 are spaced from each other such that the inner surface 24 of the outer wall 20 and the outer surface 28 of the inner wall 26 form an air gap 32 of a predetermined thickness of approximately two to three millimeters. The inner wall 26 and outer wall 20 are made of a plastic material, preferably polycarbonate. The insulated window system 10 includes a solar reflective coating 34 on the inner surface 24 of the outer wall 20. The solar reflective coating 34 has a predetermined thickness. The solar reflective coating 34 is made of a material which is deposited, on the inner surface 24. The insulated window system 10 may includes a scratch resistant coating 36 on the outer surface 22 of the outer wall 20. The scratch resistant coating 36 has a predetermined thickness such as eight nano-meters thick to provide scratch resistance to the outer wall 20. The scratch resistant coating 36 is made of glass that is deposited on the outer surface 22 via a conventional vacuum sputter deposition process. It should be appreciated that the scratch resistant coating 36 improves the durability of the insulated window system 10. It should also be appreciated that, to construct the insulated window system 10, the inner wall 26 and outer wall 20 are formed in a one-shot injection molding process, greatly reducing assembly and fabrication time. It should further be appreciated that the ends of the inner wall 26 and outer wall 28 connected together to trap or seal a gas such as air therebetween.

Accordingly, the insulated window system 10 is more difficult to break than a single pane of glass and is lighter weight than a single pane of glass. The insulated window system 10 improves climate control performance due to increased thermal resistance and improved NVH performance due to the sound insulation barrier of the trapped gas between the inner wall 26 and outer wall 20.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An insulated window system and a vehicle comprising:
a vehicle body having at least one window opening;
a first wall of plastic material disposed in said at least one window opening;
a second wall of plastic material disposed in said at least one window opening and spaced a predetermined distance from said first wall to form a gap therebetween, said first wall and said second wall being formed as a one-shot injection molding having ends connected together to seal a gas therebetween.

2. An insulated window system as set forth in claim 1 wherein said first wall has a first surface on one side and a second surface on an opposed side.

3. An insulated window system as set forth in claim 2 wherein said second wall has a third surface on one side and a fourth surface on an opposed side.

4. An insulated window system as set forth in claim 3 wherein said second surface is spaced from said third surface a predetermined distance.

5. An insulated window system as set forth in claim 4 wherein said predetermined distance is approximately two millimeters to approximately three millimeters.

6. An insulated window system as set forth in claim 2 including a solar reflective layer disposed over said second surface.

7. An insulated window system as set forth in claim 2 including a scratch resistant coating disposed over said first surface.

8. An insulated window system as set forth in claim 7 wherein said scratch resistant coating is made of a glass material.

9. An insulated window system as set forth in claim 7 wherein said scratch resistant coating is approximately eight nanometers thick.

10. An insulated window system as set forth in claim 1 wherein said plastic material is a polycarbonate material.

11. An insulated window system and a vehicle comprising:
a vehicle body having at least one window opening;
an outer wall of plastic material disposed in said at least one window opening and having a first surface on one side and a second surface on an opposed side;
an inner wall of plastic material disposed in said at least one window opening and having a third surface on one side and a fourth surface on an opposed side, said second surface being spaced a predetermined distance from said third surface to form a gap therebetween, said outer wall and said inner wall being formed as a one-shot injection molding having ends connected together to seal a gas therebetween.

12. An insulated window system as set forth in claim 11 wherein said predetermined distance is approximately two millimeters to approximately three millimeters.

13. An insulated window system as set forth in claim 11 including a solar reflective layer disposed over said second surface.

14. An insulated window system as set forth in claim 11 including a scratch resistant coating disposed over said first surface.

15. An insulated window system as set forth in claim 14 wherein said scratch resistant coating is made of a glass material.

16. An insulated window system as set forth in claim 14 wherein said scratch resistant coating is approximately eight nanometers thick.

17. An insulated window system as set forth in claim 11 wherein said plastic material is a polycarbonate material.

18. A vehicle comprising:
a vehicle body having at least one window opening;
an insulated window system disposed in said at least one window opening;
said insulated window system comprising an outer wall of polycarbonate plastic material having a first surface on one side and a second surface on an opposed side and an inner wall of polycarbonate plastic material having a third surface on one side and a fourth surface on an opposed side, said second surface being spaced a predetermined distance from said third surface to form a gap therebetween, said outer wall and said inner wall being formed as a one-shot injection molding having ends connected together to seal a gas therebetween.

19. A vehicle as set forth in claim 18 wherein said predetermined distance is approximately two millimeters to approximately three millimeters.

* * * * *